Patented Jan. 16, 1940

2,187,155

UNITED STATES PATENT OFFICE 2,187,155

PRESERVATION OF RUBBER

Joseph R. Ingram, Nitro, W. Va., assignor to Monsanto Chemical Company, St. Louis, Mo., a corporation of Delaware No Drawing. Application May 7, 1936, Serial No. 78,466

20 Claims. (Cl. 260—799)

This invention relates to the art of preserving rubber, either in the vulcanized or unvulcanized condition, and to rubber compositions so preserved.

One object of the invention is to provide a superior class of antioxidants for rubber. A further object of this invention is to provide a class of materials which, when incorporated into rubber, preferably before the vulcanization thereof, imparts thereto properties markedly resistant to tear and cracking when portions thereof have been repeatedly and alternately stretched and the tension removed. Such a process is analogous to the flexing of an automobile tire in actual service.

The age resisting characteristics of a vulcanized rubber product can be readily ascertained by subjecting portions of the vulcanized product in a bomb to the action of 300 pounds of oxygen per square inch at a temperature of 70° C. The aged rubber samples are then examined and tested and the test data compared with the unaged rubber samples. The deterioration in properties effected as a result of the oxidation treatment is indicative of the result that would normally be expected of that particular stock during actual service. Such a test is known as the Bierer-Davis aging test and produces an effect on a vulcanized rubber stock comparable with that resulting from several years of natural aging of the rubber depending on the test.

The flex cracking resistance of the vulcanized rubber products may be determined on a flexing machine as set forth by L. V. Cooper, Analytical Edition of Industrial and Engineering Chemistry, vol. 2, No. 4, 1930, pages 391-394.

This invention comprises treating rubber with a reaction product of a diaryl arylene diamine and a sulfur halide, preferably a sulfur dihalide and preferably said reaction being carried out in such a manner that in the product formed at least one of the nitrogen atoms of said amine is joined directly to a sulfur atom.

As examples of secondary aromatic amines which are reactive with sulfur halides to produce the preferred class of anti-oxidants are diphenyl-p-phenylene diamine, diphenyl-m-phenylene diamine, diphenyl-o-phenylene diamine, di beta naphthyl-p-phenylene diamine, di alpha naphthyl-p-phenylene diamine, ditolyl-p-phenylene diamine, di beta naphthyl benzidine and analogues and equivalents thereof. As examples of sulfur halides which are reactive with said diaryl arylene diamines to form products of the present invention are sulfur mono chloride and sulfur dichloride. Other sulfur halides obviously may be used.

The diaryl arylene diamines may be reacted with the sulfur halide in varying proportions. Thus, the diaryl arylene diamines react with the sulfur halides of the present invention in substantially equi-molecular proportions or in the ratio of substantially two molecular proportions of the former to substantially one molecular proportion of the latter.

The following examples are to be understood as specific embodiments of the invention and not in any sense limitative of the scope thereof.

Example I

Substantially 0.1 mole (26 parts by weight) of diphenyl-p-phenylene diamine was suspended in a suitable inert solvent, for example carbon tertachloride, and the suspension preferably cooled to a temperature preferably of 0.° to 10° C. Substantially 0.05 mole (5.2 parts by weight) of sulfur dichloride dissolved in a suitable inert solvent, for example carbon tetrachloride was added thereto, meanwhile maintaining agitation, at a temperature preferably of 0 to 10° C. When the addition of the sulfur dichloride was completed, the reaction product was agitated for a further period of substantially one to two hours. The insoluble reaction product so produced was separated from the solvent by filtration and washed with dilute aqueous alkali until neutral. It is thought that the reaction representing the preparation of the above compound proceeds as follows:

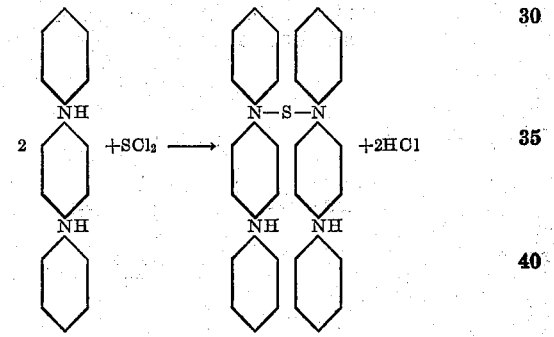

The resinous solid prepared as described above was incorporated in the well known manner in a rubber stock comprising

| | Parts |
|---|---|
| Smoked sheet rubber | 100 |
| Carbon black | 50 |
| Zinc oxide | 5 |
| Sulfur | 3 |
| Pine tar | 2 |
| Stearic acid | 3 |
| Benzothiazyl thiobenzoate | 0.8 |
| Diphenyl guanidine | 0.2 |
| The reaction product of substantially two molecular proportions of diphenyl-p-phenylene diamine and substantially one molecular proportion of sulfur dichloride | 1.0 |

The rubber stock so compounded was vulcanized by heating in a press at the temperature of 30 pounds of steam pressure per square inch and the vulcanized rubber aged in the oxygen bomb at a temperature of 70° C. and under a pressure of 300 pounds of oxygen per square inch. The results follow in Table I.

*Table I*

| Cure | | Hours aged | Modulus of elasticity in lbs./in.² at elongations of— | | | | Tensile at break in lbs./in.² | Ultimate elongation percent |
|---|---|---|---|---|---|---|---|---|
| Minutes | Pounds steam pressure | | 200% | 300% | 400% | 500% | | |
| 60 | 30 | 0 | | 1930 | | 3755 | 4205 | 550 |
| 60 | 30 | 96 | 1198 | | 2675 | | 2885 | 440 |
| 75 | 30 | 0 | | 2100 | | 4000 | 4240 | 535 |
| 75 | 30 | 96 | 1285 | | 2730 | | 2730 | 400 |
| 90 | 30 | 0 | | 2255 | | 4110 | 4160 | 505 |
| 90 | 30 | 96 | 1405 | | | | 2770 | 395 |

An examination of the data given in Table I shows that the preferred class of compounds, for example the reaction product of diphenyl-p-phenylene diamine and sulfur dichloride possesses exceptionally good aging properties. Moreover, when portions of the unaged rubber stocks were flexed in the manner hereinbefore set forth, the stocks containing the preferred class of materials were found to possess exceptionally good flexing properties. Portions of the above unaged vulcanized rubber stocks were artificially aged in the Geer oven for 3 days at a temperature of 70° C. and then flexed in the manner described above. Here, even after this drastic treatment, the aged rubber stocks possessed exceptionally good flexing properties.

*Example II*

Substantially equi-molecular proportions of diphenyl-p-phenylene diamine and sulfur dichloride have been reacted in an inert solvent in a manner analogous to that given in Example I. It is believed that the reaction involved may be represented as follows:

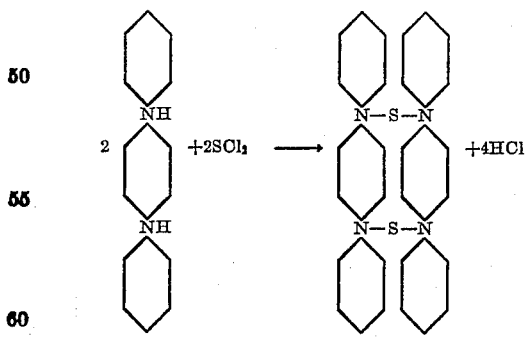

The solid product so obtained was incorporated in a tread stock comprising

| | Parts |
|---|---|
| Smoked sheet rubber | 100 |
| Carbon black | 50 |
| Zinc oxide | 5 |
| Sulfur | 3 |
| Pine tar | 2 |
| Stearic acid | 3 |
| Benzothiazyl thiobenzoate | 0.8 |
| Diphenyl guanidine | 0.2 |
| The reaction product of substantially equi-molecular proportions of diphenyl-p-phenylene diamine and sulfur dichloride | 1.0 |

The compounded rubber stock was vulcanised by heating in a press at 30 pounds of steam pressure per square inch and the vulcanized rubber product aged in the oxygen bomb at a temperature of 70° C. and under a pressure of 300 pounds of oxygen per square inch. The results follow in Table II.

*Table II*

| Cure | | Hours aged | Modulus of elasticity in lbs./in.² at elongations of— | | Tensile at break in lbs./in.² | Ultimate elongation, percent |
|---|---|---|---|---|---|---|
| Minutes | Pounds steam pressure | | 200% | 400% | | |
| 60 | 30 | 0 | 1180 | 3210 | 4285 | 535 |
| 60 | 30 | 96 | 1128 | 2080 | 2080 | 400 |
| 75 | 30 | 0 | 1365 | 3400 | 4020 | 480 |
| 75 | 30 | 96 | 1170 | | 2010 | 365 |
| 90 | 30 | 0 | 1380 | 3355 | 4345 | 525 |
| 90 | 30 | 96 | 1143 | | 1845 | 300 |

*Example III*

As a further specific embodiment of the present invention substantially two molecular proportions of di-beta-naphthyl-p-phenylene diamine were reacted with substantially one molecular proportion of sulfur dichloride in a manner analogous to that employed in Example I. The product so obtained was milled in a rubber tread stock in the well-known manner comprising

| | Parts |
|---|---|
| Smoked sheet rubber | 100 |
| Carbon black | 50 |
| Zinc oxide | 5 |
| Sulfur | 3 |
| Pine tar | 2 |
| Stearic acid | 3 |
| Mercapto-benzo-thiazole | 1 |
| The reaction product of substantially two molecular proportions of di-beta-naphthyl-p-phenylene diamine and substantially one molecular proportion of sulfur dichloride | 1 |

The compounded rubber stock was vulcanized and the cured rubber product aged in the oxygen bomb at a temperature of 70° C. and under an oxygen pressure of 300 pounds of oxygen per square inch. The tensile and modulus characteristics of the aged and unaged cured rubber stocks follow in Table III.

*Table III*

| Cure | | Hours aged | Modulus of elasticity in lbs./in.² at elongations of— | | Tensile at break in lbs./in.² | Ultimate elongation, percent |
|---|---|---|---|---|---|---|
| Minutes | Pounds steam pressure | | 200% | 400% | | |
| 60 | 30 | 0 | 1145 | 3020 | 4360 | 545 |
| 60 | 30 | 96 | 980 | 1965 | 2065 | 410 |
| 75 | 30 | 0 | 1165 | 3060 | 4280 | 530 |
| 75 | 30 | 96 | 995 | | 1810 | 385 |
| 90 | 30 | 0 | 1230 | 3220 | 4160 | 500 |
| 90 | 30 | 96 | 953 | | 1683 | 350 |

*Example IV*

As a further specific embodiment of the present invention, substantially two molecular proportions of di-p-tolyl-p-phenylene diamine were reacted with substantially one molecular proportion of sulfur dichloride in a manner analogous to that employed in Example I. The solid product so obtained was milled in a rubber stock comprising

|   | Parts |
|---|---|
| Smoked sheet rubber | 100 |
| Carbon black | 50 |
| Zinc oxide | 5 |
| Sulfur | 3 |
| Pine tar | 2 |
| Stearic acid | 3 |
| Benzothiazyl thiobenzoate | 0.8 |
| Diphenyl guanidine | 0.2 |
| The reaction product of substantially two molecular proportions of di-p-tolyl-p-phenylene diamine and substantially one molecular proportion of sulfur dichloride | 1.0 |

The compounded rubber stock was vulcanized and the cured rubber product aged in the oxygen bomb at a temperature of 70° C. and under a pressure of 300 pounds of oxygen per square inch, and on testing the results were obtained as given in Table IV.

*Table IV*

| Cure | | Hours aged | Modulus of elasticity in lbs./in.² at elongations of— | | Tensile at break in lbs./in.² | Ultimate elongation, percent |
|---|---|---|---|---|---|---|
| Minutes | Pounds steam pressure | | 200% | 400% | | |
| 60 | 30 | 0 | 1175 | 3080 | 4305 | 530 |
| 60 | 30 | 96 | 1195 | 2430 | 2655 | 445 |
| 75 | 30 | 0 | 1285 | 3210 | 4300 | 520 |
| 75 | 30 | 96 | 1255 | 2440 | 2580 | 440 |
| 90 | 30 | 0 | 1325 | 3350 | 4310 | 515 |
| 90 | 30 | 96 | 1280 | | 2470 | 395 |

An examination of the test data set forth in the above tables shows the antioxidants of the present invention to possess the desirable rubber preservative properties typical of the class. Further, flexing tests carried out in the manner hereinbefore described shows the preferred class of materials as exemplified by the specific examples set forth above to possess desirable flexing properties when employed in the unaged stocks and also in the stocks aged for 3 days in the Geer oven at a temperature of 70° C.

Obviously, practice of the present invention is not limited to the specific compositions given above, such compositions being merely illustrative of the manner of employing the antioxidants or age-resisters of this invention. The antioxidants or age-resisters may be employed in conjunction with other vulcanizing agents than those specifically disclosed, for this invention is applicable generally to pure rubber or rubber compositions of the most varied nature. Furthermore, the preferred class of materials may be employed in rubber stocks in conjunction with other accelerators than the ones specifically shown with varying differences in tensile and modulus properties but still exhibiting the desirable qualities of the class.

It is to be understood that the term "treating" as employed in the appended claims is used in a generic sense to include either the incorporating of the preferred class of materials into the rubber by milling or similar process, or their addition to the rubber latex before its coagulation, or to the application thereof to the surface of a mass of crude or vulcanized rubber. The term "rubber" is likewise employed in the claims in a generic sense to include caoutchouc, whether natural or synthetic, reclaimed rubber, balata, gutta percha, rubber isomers and like products whether or not admixed with fillers, pigments or accelerating agents.

The present invention is limited solely by the claims attached hereto as part of the present specification.

This application is an improvement over my prior Patent 1,896,544 granted February 7, 1933.

What is claimed is:

1. The method of preserving rubber which comprises treating rubber with a product obtainable by reacting in the presence of an inert organic solvent under cooling conditions and substantially below room temperature a N,N' diaryl arylene diamine and a sulfur chloride, wherein a nitrogen atom of said secondary amine is joined directly to a sulfur atom.

2. The method of preserving rubber which comprises treating rubber with a product obtainable by reacting in the presence of an inert organic solvent under cooling conditions and substantially below room temperature a N,N' diphenyl-p-phenylene diamine and a sulfur chloride, wherein a nitrogen atom of said secondary amine is joined directly to a sulfur atom.

3. The method of preserving rubber which comprises treating rubber with a product obtainable by reacting in the presence of an inert organic solvent under cooling conditions and substantially below room temperature a N,N' diaryl arylene diamine and sulfur dichloride, wherein a nitrogen atom of said amine is joined directly to a sulfur atom.

4. The method of preserving rubber which comprises treating rubber with a product obtainable by reacting in the presence of an inert organic solvent under cooling conditions and substantially below room temperature a N,N' diaryl phenylene diamine and sulfur dichloride, wherein a nitrogen atom of said amine is joined directly to a sulfur atom.

5. The method of preserving rubber which comprises treating rubber with a product obtainable by reacting in the presence of an inert organic solvent under cooling conditions and substantially below room temperature a N,N' diphenyl phenylene diamine and sulfur dichloride, wherein a nitrogen atom of said secondary amine is joined directly to a sulfur atom.

6. The method of preserving rubber which comprises treating rubber with a product obtainable by reacting in the presence of an inert organic solvent under cooling conditions and substantially below room temperature substantially two molecular proportions of N,N' diphenyl-p-phenylene diamine and substantially one molecular proportion of sulfur dichloride, wherein a nitrogen atom of said secondary amine is joined directly to a sulfur atom.

7. The method of preserving rubber which comprises treating rubber with a product obtainable by reacting in the presence of an inert organic solvent under cooling conditions and substantially below room temperature substantially equimolecular proportions of N,N' diphenyl-p-phenylene diamine and sulfur dichloride, wherein each of the two nitrogen atoms of said amine are joined directly to a sulfur atom.

8. The method of preserving rubber which comprises treating rubber with a product obtainable by reacting in the presence of an inert organic solvent under cooling conditions and substantially below room temperature substantially two molecular proportions of N,N' di-p-tolyl-p-phenylene diamine and substantially one molecular proportion of sulfur dichloride, wherein a nitrogen atom of said secondary amine is joined directly to a sulfur atom.

9. A composition comprising rubber and a product obtainable by reacting in the presence of an inert organic solvent under cooling conditions and substantially below room temperature a N,N' diaryl arylene diamine and a sulfur chloride, wherein a nitrogen atom of said secondary amine is joined directly to a sulfur atom.

10. A composition comprising rubber and a product obtainable by reacting in the presence of an inert organic solvent under cooling conditions and substantially below room temperature a N,N' diphenyl-p-phenylene diamine and a sulfur chloride, wherein a nitrogen atom of said secondary amine is joined directly to a sulfur atom.

11. A composition comprising rubber and a product obtainable by reacting in the presence of an inert organic solvent under cooling conditions and substantially below room temperature a N,N' diaryl arylene diamine and sulfur dichloride, wherein a nitrogen atom of said amine is joined directly to a sulfur atom.

12. A composition comprising rubber and a product obtainable by reacting in the presence of an inert organic solvent under cooling conditions and substantially below room temperature a N,N' diaryl phenylene diamine and sulfur dichloride, wherein a nitrogen atom of said amine is joined directly to a sulfur atom.

13. A composition comprising rubber and a product obtainable by reacting in the presence of an inert organic solvent under cooling conditions and substantially below room temperature a N,N' diphenyl phenylene diamine and sulfur dichloride, wherein a nitrogen atom of said secondary amine is joined directly to a sulfur atom.

14. A composition comprising rubber and a product obtainable by reacting in the presence of an inert organic solvent under cooling conditions and substantially below room temperature substantially two molecular proportions of N,N' diphenyl-p-phenylene diamine and substantially one molecular proportion of sulfur dichloride, wherein a nitrogen atom of said secondary amine is joined directly to a sulfur atom.

15. A composition comprising rubber and a product obtainable by reacting in the presence of an inert organic solvent under cooling conditions and substantially below room temperature substantially equi-molecular proportions of N,N' diphenyl-p-phenylene diamine and sulfur dichloride, wherein each of the two nitrogen atoms of said amine are joined directly to a sulfur atom.

16. A composition comprising rubber and a product obtainable by reacting in the presence of an inert organic solvent under cooling conditions and substantially below room temperature substantially two molecular proportions of N,N' di-p-tolyl-p-phenylene diamine and substantially one molecular proportion of sulfur dichloride, wherein a nitrogen atom of said secondary amine is joined directly to a sulfur atom.

17. A vulcanized rubber product possessing age resisting properties comprising the vulcanization product of a rubber stock containing prior to the vulcanization thereof a product obtainable by reacting in the presence of an inert organic solvent under cooling conditions and substantially below room temperature a N,N' diaryl arylene diamine and sulfur dichloride, wherein a nitrogen atom of said secondary amine is joined directly to a sulfur atom.

18. A vulcanized rubber product possessing age resisting properties comprising the vulcanization product of a rubber stock containing prior to the vulcanization thereof a product obtainable by reacting in the presence of an inert organic solvent under cooling conditions and substantially below room temperature a N,N' diaryl phenylene diamine and sulfur dichloride, wherein a nitrogen atom of said secondary amine is joined directly to a sulfur atom.

19. The method of preserving rubber which comprises treating rubber with a product obtainable by reacting in the presence of an organic solvent under cooling conditions and substantially below room temperature a N,N' diaryl arylene diamine and a sulfur chloride.

20. A composition comprising rubber and a product obtainable by reacting in the presence of an inert organic solvent under cooling conditions and substantially below room temperature a N,N' diaryl arylene diamine and a sulfur chloride.

JOSEPH R. INGRAM.